United States Patent

[11] 3,593,090

| [72] | Inventor | Robert W. Kearns<br>Detroit, Mich. |
|------|----------|---|
| [21] | Appl. No. | 816,748 |
| [22] | Filed | Apr. 16, 1969<br>Division of Ser. No. 532,433, Mar. 7, 1966,<br>Pat. No. 3,483,459 |
| [45] | Patented | July 13, 1971 |
| [73] | Assignee | Tann Company<br>Detroit, Mich. |

[54] INTERMITTENT WINDSHIELD WIPER CONTROL
18 Claims, 14 Drawing Figs.

| [52] | U.S. Cl. | 318/444, 318/466 |
|------|----------|---|
| [51] | Int. Cl. | H02p 1/04 |
| [50] | Field of Search | 318/443, 444, 466, 467 |

[56] References Cited
UNITED STATES PATENTS

| 3,151,257 | 9/1964 | Anderson | 318/443 |
|-----------|--------|----------|---------|
| 3,333,174 | 7/1967 | Moller | 318/443 |
| 3,351,836 | 11/1967 | Kearns | 318/466 |
| 3,406,322 | 10/1968 | De Dube, Jr. | 318/467 |
| 3,407,345 | 10/1968 | Freuhauf | 318/443 |

*Primary Examiner*—Benjamin Dobeck
*Assistant Examiner*—Thomas Langer
*Attorney*—Lane, Aitken, Dunner & Ziems ABSTRACT: A control for the electric motor of a windshield wiper motor unit which operates the unit intermittently with a dwell period after each wiping cycle with the length of time of the dwell periods varying inversely with the amount of moisture on the windshield.

PATENTED JUL 13 1971 SHEET 1 OF 6 3,593,090

INVENTOR
Robert W. Kearns
BY
ATTORNEYS

INVENTOR
Robert W. Kearns

INVENTOR
Robert W. Kearns

INVENTOR
Robert W. Kearns

INVENTOR
Robert W. Kearns 3,593,090

INTERMITTENT WINDSHIELD WIPER CONTROL

REFERENCE TO RELATED APPLICATION

This application is a division of applicant's copending application, Ser. No. 532,433 filed Mar. 7, 1966 and entitled Motor Control Device, now U.S. Pat. No. 3,483,459 granted Dec. 9, 1969.

SUMMARY OF THE INVENTION

The present invention relates to windshield wiper systems and more particularly to a control device for controlling the motor of a windshield wiper system of a vehicle in a manner to produce intermittent wiping operation.

It is one object of the invention to provide a control device for energizing a windshield wiper motor of a vehicle windshield wiper cleaning system in a manner to activate the wiper blades intermittently through a complete wiping cycle with a dwell period at the end of each wiping cycle.

It is another object of the invention to provide a control device for controlling a windshield wiper motor as described above to produce intermittent operation of the wiper blades with a dwell period at the end of each wiping cycle wherein the length of time of each dwell period is automatically responsive to the moisture on the windshield, the length of time of each dwell period decreasing as the moisture on the windshield increases.

It is a further object of the invention to provide a control device for a windshield wiper motor of the type described above wherein the dwell period at the end of each wiping cycle is automatically skipped when the moisture on the windshield exceeds a threshold value to in effect place the windshield wipers in continuous operation.

It is a still further object of the invention to provide a simple and economical printed circuit card control device for controlling the operation of a windshield wiper system in a manner to enable the wiper blades to be selectively operated in a continuously variable mode of operation, or an intermittent mode of operation having an automatically variable predetermined dwell period at the end of each wiping cycle and automatically skipping the dwell period at the end of each wiping cycle when the moisture on the windshield exceeds a threshold value.

It is a still further object of the invention to provide a printed circuit card control device responsive to the angular position of a windshield wiper motor or activating windshield wiper blades intermittently through complete wiping cycles with a dwell period at the end of each wiping cycle.

Other objects and features of novelty of the present invention will be specifically pointed out or will otherwise become apparent when referring, for a better understanding of the invention, to the following description taken in conjunction with the accompanying drawings, wherein:

BRIEF DESCRIPTION OF THE DRAWINGS

FIG. 13 is a view of the conducting ring face of a printed circuit card illustrating another modification of the invention; and FIG. 14 is a schematic circuit diagram illustrating a modification of FIG. 7.

DESCRIPTION OF THE PREFERRED EMBODIMENTS

Figure 1:
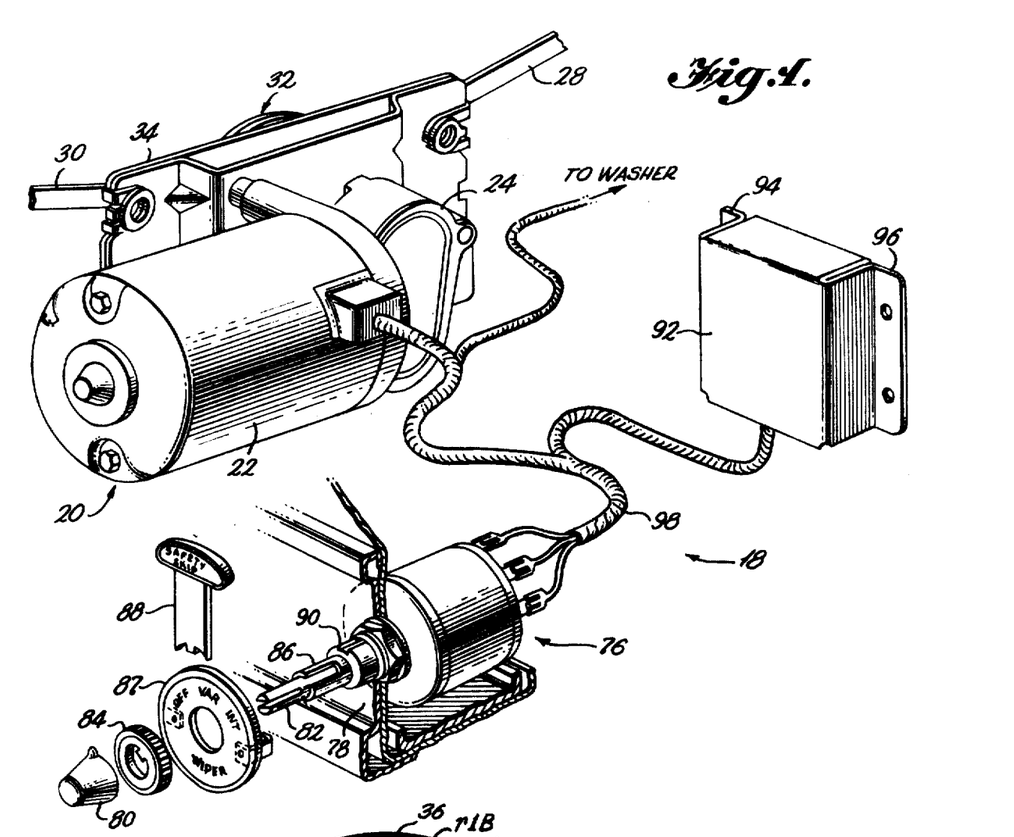
FIG. 1 is a perspective view of the components of a vehicle windshield-wiping system embodying features of the invention.

Referring to FIG. 1, a windshield wiper assembly 18 is illustrated which embodies features of the invention. It comprises a conventional motor unit 20 having an electric motor 22 driving a speed-reducing unit 24. The output shaft 26 of the speed-reducing unit (not shown in FIG. 1 but schematically illustrated in FIG. 3) rotates a conventional crank arm connected to links 28 and 30 which in turn are connected to the wiper blade assemblies so as to oscillate windshield wiper blades back and forth across a windshield of a vehicle in a conventional manner. Since the motor unit 20, to the extent just described, is conventional, it will not be described in greater detail.

Figure 2:
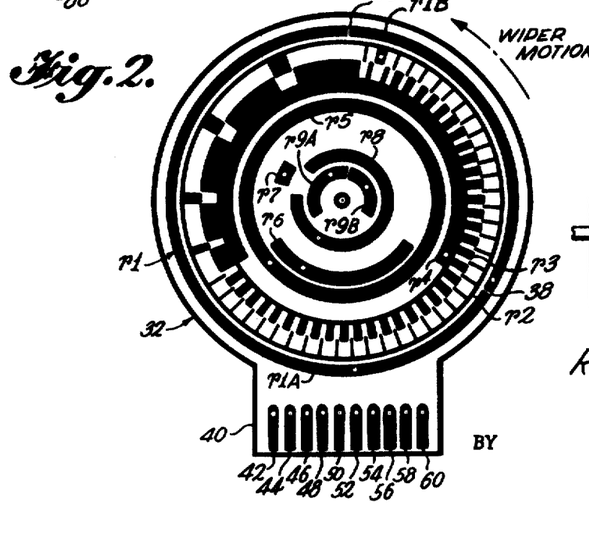
FIG. 2 is an enlarged view of the conductive ring face of a printed circuit card mounted on the wiper motor unit illustrated in FIG. 1.

In accordance with one embodiment of the present invention, a printed circuit card 32, illustrated in greater detail in FIG. 2, is mounted on and spaced rearwardly from a base plate 34 of the motor unit 20. The side of the printed circuit card facing toward the baseplate 34 is provided with nine concentric rings r1—r9 each having a plurality of conductive segments with nonconductive segments therebetween, except ring r5, which is a complete conductive ring. The outer ring r1 is made up of two conductive segments r1A and r1B which combine to make substantially one complete ring interrupted at 36 and 38 to electrically isolate the conductive segments from one another. The base 40 of the printed circuit card is provided with ten terminals 42—60 which are electrically connected to the conductive segments of the various rings by printed circuit paths printed on the back face of the printed circuit card.

Figure 3:
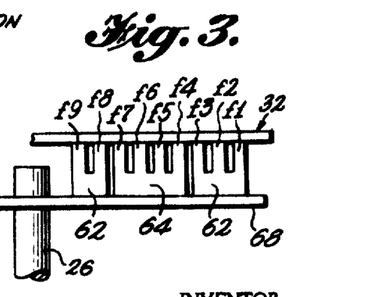
FIG. 3 is a fragmentary side view of the rotating wiper contact assembly slidably engaging the conductive rings on the face of the printed circuit card of FIG. 2.
Figure 9:
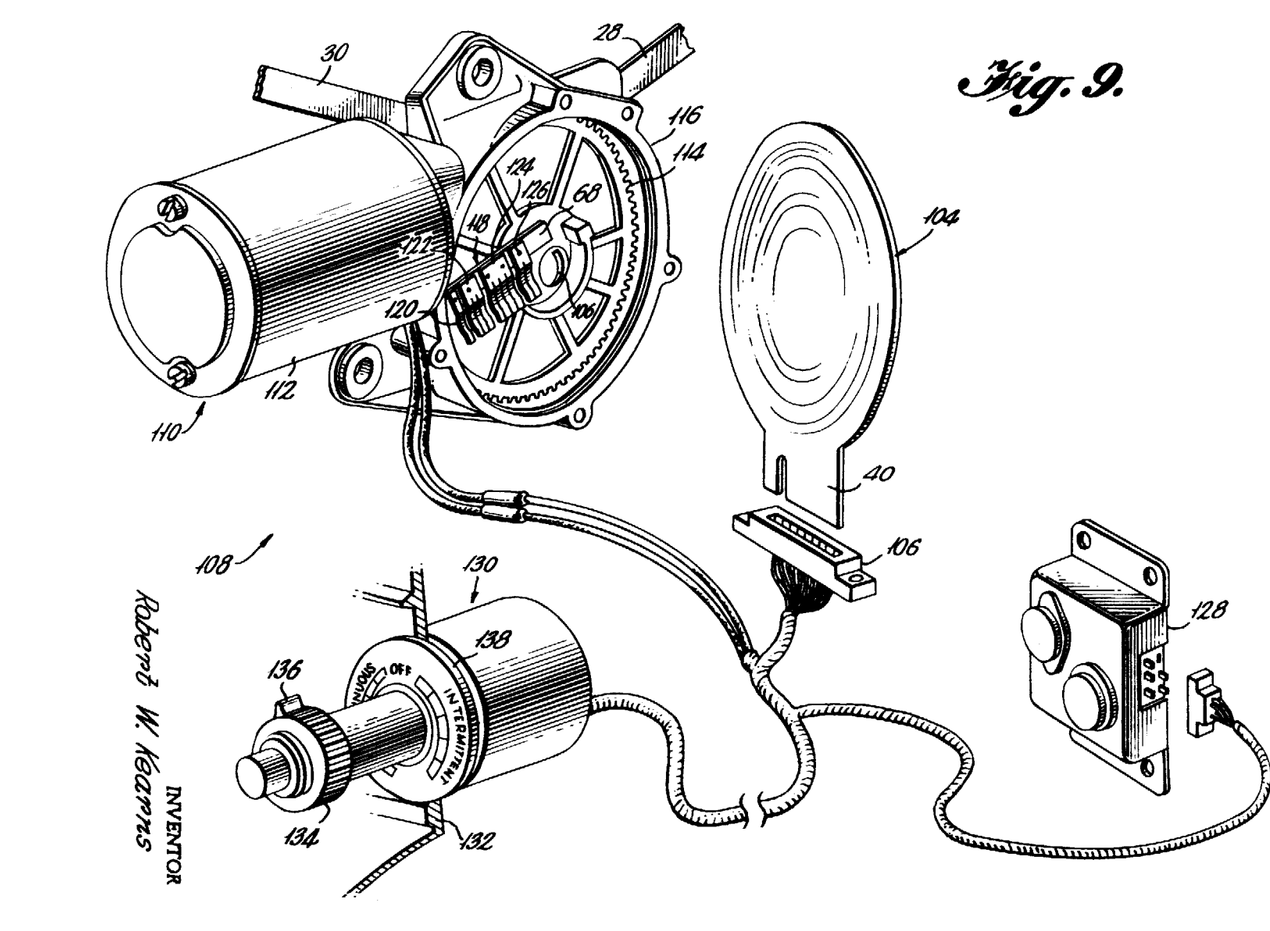
FIG. 9 is a view similar to FIG. 1 illustrating another embodiment of the invention.

Referring to FIG. 3, a wiper contact assembly 61 is shown comprising three electrically isolated wiper units 62, 64 and 66 mounted on an arm 68 suitably connected to the speed reducer output shaft 26 for rotation therewith. The wiper unit 66 has three spring contact fingers f1—f3 which slidably engage rings r1—r3 of the printed circuit card 32, the wiper unit 64 has four spring contact fingers f4—f7 which slidably engage the rings r4—r7, and the wiper unit 62 has two spring contact fingers f8 and f9 which slidably engage the rings r8 and r9. Reference is made to FIG. 9 which illustrates a wiper contact assembly 114 mounted on the arm 68 of a different type of motor unit in position to slidably engage the face of a printed circuit card 104 in a similar manner.

Referring again to FIG. 1, a mode switch 76 is illustrated which can be mounted on the dashboard panel 78 of the automotive vehicle in position to enable the operator to manually control the operation of the windshield wiper blades by adjusting the following: a knob 80 is fixed on the end of a shaft 82 of the mode switch, a ring 84 keyed to a sleeve 86, and a safety skip lever 88 which is keyed to a sleeve 90 of the mode switch. With this construction, the ring 84 and safety skip lever 88 separately control the sleeve 86 and sleeve 90, respectively, to perform separate control functions as will be described in greater detail hereinafter, and the knob 80 controls the shaft 82 which actuates the moveable contact of a three-position switch having five sections, as will be described, the three positions being indicated on the face of the indicator disc 87 as OFF, VAR (variable speed continuous wiping) and INT (intermittent wiping).

The remaining components of the control device of the present invention, such as transistors, resistors and capacitors, are all contained within a small housing 92 having flanges 94 and 96 for mounting the housing in a suitable position, such as on the firewall of the vehicle immediately behind the dashboard panel 78. An electric cable 98 having the necessary wires therein is connected to the mode switch 76 and extends therefrom as illustrated to the electric motor 22, the electrical components within the housing 92 and the windshield washer to provide the necessary electrical connections.

Figure 4:
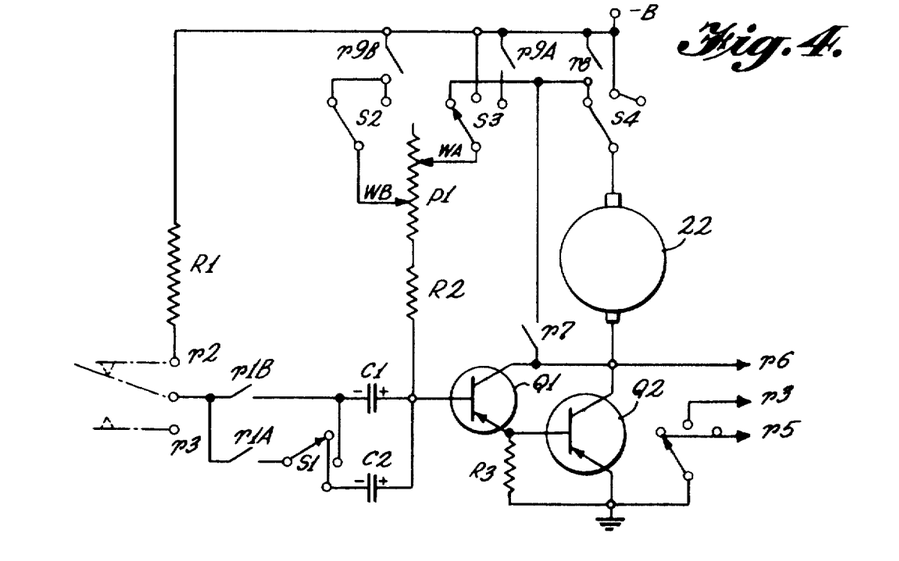
FIG. 4 is a schematic circuit diagram illustrating one embodiment of the control device of the present invention.

The complete schematic circuit diagram of the control device of the present invention is illustrated in FIG. 4 wherein the various rings of the printed circuit card are schematically illustrated as switches r1A, r1B, r2—r8, r9A and r9B, and the five switch sections of the mode switch 76 are illustrated as single-pole, three-position switches S1—S5, each having three contacts corresponding to the OFF, VAR and INT positions previously mentioned, the movable contact of each of the five switch sections being in the OFF position as illustrated in FIG. 4. The other main components of the circuit are transistors Q1 and Q2 with the electric motor 22 connected in series with the emitter-collector circuit of the transistor Q2, the capacitors C1 and C2, fixed resistors R1, R2 and R3, and a variable resistor or potentiometer P1 having two wiper arms WA and WB.

Before describing the circuit of FIG. 4 is detail, the general operation of the wiper unit will be described. One of the three positions of the mode switch 76 is selected by the operator by rotating the knob 80 so that the pointer thereon is directed to the desired position on the indicator disc 87. When the VAR position is selected, the motor 22 is pulsed in a unique manner to operate continuously at a speed determined by the position of the wiper arm WA (FIG. 4) on the potentiometer P1, the position of the wiper arm WA being controlled by the ring 84 of the mode switch. The motor 22 will operate at its maximum speed when the entire potentiometer P1 is shunted out of the circuit by the wiper arm WA, and as the wiper arm is moved upwardly along the potentiometer away from the resistor R2 to add more of it into the circuit, the full power pulses change to decrease the percentage of time the motor is energized so that the speed of the motor decreases until it reaches its slowest speed when the entire potentiometer P1 is in the circuit. However, at high and low speeds, the motor is energized at substantially full power each time it is pulsed.

When the operator selects the INT position by turning the knob 80 to its extreme clockwise position, the motor will be energized intermittently to actuate the wiper blades through one complete cycle across the windshield, that is through a complete upstroke and return stroke back to a point near the park position of the wipers. At the end of the return stroke, the motor 22 is automatically deenergized by the control circuit for a predetermined dwell period, and then reenergized by the control circuit to actuate the wiper blades through another complete cycle followed by a dwell period. The length of the dwell period is controlled by the position of the wiper arm WA which is controlled by the ring 84 of the mode switch, as previously described.

The intermittent mode of operation with the dwell period at the end of each cycle is of course selected during a light rain or drizzle when there is insufficient moisture on the windshield to require operating the wiper blades continuously. In accordance with a unique feature of the present invention, the control circuit of the present invention also automatically provides a unique safety skip feature when in the intermittent mode of operation. In the event the rainfall increases so as to increase the moisture on the windshield, or in the event spray from the road increases the moisture on the windshield, such as when another vehicle is passed, the windshield wiper blades will automatically skip the dwell periods at the end of each cycle to in effect automatically place the wiper blades in continuous operation until the moisture on the windshield again drops below a predetermined threshold value, at which time the wiper blades automatically return to the intermittent mode of operation with the dwell period at the end of each cycle.

The threshold value at which the wiper blades automatically change from intermittent operation to continuous operation, and vice versa, in response to the moisture on the windshield is controlled by the position of the wiper arm WB on the potentiometer P1 which, in turn, is controlled by the safety skip lever 88. Consequently, when the operator selects the intermittent mode of operation because of a light rainfall or drizzle, he also simply positions the safety skip lever so that the wiper blades dwell at the end of each cycle and thus, in effect, select the threshold value at which the safety skip feature will come into play. Of course, in a simplified version of the control device, the safety skip lever 88 could be eliminated and the position of the wiper arm WB determined by an adjustment made at the factory with suitable provision made for future infrequent adjustments to compensate for wear of the wipers or other changes in conditions. However, the safety skip lever 88 provides a very simple and desirable way of enabling the operator to in effect dial in the desired safety skip point at the time he selects the intermittent mode of operation.

The operation of the control circuit illustrated in FIG. 4 will now be discussed in detail. The emitter of the transistor Q2 is connected directly to ground with the collector thereof connected to one side of the armature of the motor 22 which in this embodiment is a DC motor having a constant field. The constant field can come from a permanent magnet or a wound field supplied by a constant voltage. The wound field could be a shunt, compound or other type of winding. The other side of the motor armature is connected to the moveable contact of switch S4 which, as previously described, forms one section of the mode switch 76. The emitter of the transistor Q1 is connected to the base of the transistor Q2 and to ground through a temperature-compensating resistor R3. The collector of the transistor Q1 is connected to the collector of the transistor Q2 and to the OFF contacts of the switches S3 and S4 through the ring r7 of the printed circuit card.

When the mode switch is turned to the VAR or continuously variable position, the switch S4 connects the motor 22 to a negative source of voltage −B, such as the negative terminal of a vehicle battery, and the base of the transistor Q1 is also connected to the negative potential −B through the capacitor C1 and the resistor R1 when the switches formed by the conductive segments r1B and r1A (both of which are connected to the negative terminal of the capacitor C1) and the ring r2 are closed. The ring r3 also is employed as will be described and is connected to ground through the switch S5. The rings r4, r5, r6, r7, r8 and conductive segments r9A and r9B are not used electrically in the continuously variable mode now being described. The wiper arm WA is connected to the negative potential −B through the switches S3 and the wiper arm WB is electrically disconnected from the circuit by the switch S2. Should the wiper contact assembly 61 stop in the gap between rings r1A and r1B when turned off after a previous use, the motor would start up because current flows out of the base of the transistor Q1 through resistor R2, potentiometer P1, the wiper arm WA and switch S3 to the negative potential −B. Because of this, the conductive segments r1A and r1B may be considered, in the variable mode of operation, as forming one complete ring r1 which cooperates with rings r2 and r3 and the rotating wiper contact assembly 61 to form a two-pole, single-throw switch which operates as many times per revolution of the wiper contact assembly as there are conductive segments on the rings r2 and r3. For the card shown, ring r1 is connected to the conductive segments of the ring r2 and then to the conductive segments of the ring r3 and back to the conductive segments of the ring r2 at the rate of 60 times per revolution of the wiper contact assembly if the θ angle pattern were the same as the rest of the card.

It is important to note that this switching function serves as a square wave oscillator for pulsing the motor 22 which is sensitive to both position and the load torque on the motor.

CONTINUOUSLY VARIABLE MODE OF OPERATION

The variable mode of operation will be discussed first, with the assumption that the load torque is constant. When the wiper contact assembly is positioned so that the ring r1 is not connected to a conductive segment on either ring r2 or r3, the motor 22 is turned ON by the base current flowing through resistor R2 and potentiometer P1. Since the motor is ON, the wiper contact assembly continues to turn until ring r1 is connected to a conductive segment on ring r2. The motor is still ON, but even more so now since base current flows into capacitor C1 as well as flowing through resistor R2 and potentiometer P1. The current flowing into capacitor C1 charges it, and there is ample time for the capacitor to become fully charged since it is a small capacitor. The negative terminal of the capacitor is now at −B potential with the positive terminal about −0.4 volts due to the voltage drop across the transistor emitters. As the motor continues to turn the wiper contact unit 66, ring r1 is disconnected from a conductive segment on ring r2, but the capacitor C1 retains its charge and again the motor stays ON due to current flowing through resistor R2 and potentiometer P1. As the motor continues to turn the wiper contact unit 66, ring r1 is connected to a conductive segment on ring r 3. However, since the voltage drop across the capacitor C1 cannot change instantaneously, the positive terminal of the capacitor is at +B volts potential because the negative terminal of the capacitor is now connected directly to ground.

With the base of the transistor Q1 positive with respect to its emitter, the transistors are turned OFF to turn the power to the motor 22 OFF. The motor, however, will continue to turn due to the momentum of the windshield wiper system. The capacitor C1 discharges through the resistor R2 and potentiometer P1 toward −B volts. Therefore, the base potential of the transistor Q1, which has been at +B volts discharges with a short RC time constant toward −B volts. The time that the motor 22 is OFF depends upon how long the base is positive with respect to the emitter which in turn depends upon the setting of the potentiometer P1 which varies the RC time constant. When the base voltage of the transistor Q1 returns to approximately −0.4 volts, the transistors are turned ON and the motor 22 again receives power even though the ring r1 may still be connected to the ring r3 by virtue of the wiper contact unit 66 still contacting a portion of a conductive segment on ring r3. Capacitor C1 is practically discharged and the transistors are ON by virtue of base current flowing through the resistor R2 and potentiometer P1. The motor remains ON while the wiper contact unit 66 leaves the conductive segment on ring r3 and recharges the capacitor C1 by connecting ring r1 to a conductive segment on ring r2, as previously explained. The motor is turned OFF as soon as the wiper contact unit 66 contacts the leading edge of the next conductive segment on ring r3. Thus the motor is rapidly pulsed at full power during the continuously variable mode of operation, but the windshield wiper blades operate smoothly and the system seeks out an equilibrium speed where the power input just balances the system losses and the work done.

When the capacitor C1 discharges quickly due to a low value of the potentiometer P1 (as determined by the position of the wiper arm WA controlled by the ring 84 on the mode switch 76), the motor is ON a larger percentage of the time and the motor speed is therefore fast. Furthermore, the motor is energized at substantially full power each time it is turned ON because the emitter-collector circuit of the transistor Q2 dissipates very little power as compared to the variable resistors commonly connected in series with a motor to vary its speed. A minimum value of speed is established by the ratio of (1) the width of the space between the narrower conductive segments on the ring r3 positioned outside the angle θ on the printed circuit card and (2) the combined width of such a space and the width of one of the narrower conductive segments. It will be apparent that this is the case because even if the base voltage of the transistor Q1 has not decayed to −0.4 volts, the motor 22 turns ON when the wiper unit 66 leaves a conductive segment on the ring r3 since the negative terminal of the capacitor C1 is electrically disconnected from ground and base current flows through resistor R2 and potentiometer P1.

It will be observed that in the region of the printed circuit card indicated by the angle θ, hereinafter referred to as the θ region, the width of the conductive segments on the rings r3 and r2 changes, with the conductive segments at the beginning of the angle θ being wider than the conductive segments near the end of the angle θ. Specifically, in the angle θ there are five conductive segments on the ring r3 and four on the ring r2. This is of primary significance in connection with the intermittent mode of operation to be described since for the continuously variable mode now being described, the number of conductive segments in the θ region is not too important. The principal effect of these particular segments is that the motor is ON for a greatly increased percentage of time due to the elongated segments on the ring r3 in the θ region so that the motor speed picks up in this region, which is symmetrical with respect to the park position of the wiper blades, to provide a quick turnaround feature. At this point it is noted that the speed of the wiper assembly relative to the printed circuit card is constant assuming the speed of the motor 22 is constant, whereas the speed of the wiper blades during one complete cycle more or less follows a sine wave so that at the turnaround points of the wiper blades the blades are travelling slower relative to the speed of the motor than they are at the midpoints of the upstroke and return stroke. By varying the conductive segment pattern on the rings r2 and r3, it is apparent that a variety of wiper blade speeds versus wiper blade positions can be achieved.

By pulsing the motor with substantially full power pulses the speed-torque characteristics of the motor are greatly improved. This will be appreciated by considering the effect of an increase in load on the wiper motor 22 due to increased drag encountered by the wiper blades on the windshield, for example. The RC time constant previously described depends on time and is independent of the load, whereas an increase in load slows the motor 22 down. Therefore, it takes a longer time for the wiper unit 66 to reach the end of a conductive segment on the ring r3, at which point the transistors are automatically turned ON if the base voltage has not decayed to −0.4 volts as previously described. However, since the RC time constant is fixed for a given position of the wiper arm WA, the base voltage will decay to this value after a given time and the transistors will be turned ON even though the wiper unit 66 is still on a conductive segment on the ring r3 due to the reduced speed of the motor 22. Thus the percentage of ON time in each ON-OFF cycle of the pulsed operation is automatically increased to partially offset the increase in load. Stated otherwise, during the continuously variable mode of operation, the motor is pulsed on and off by the switching function provided by rings r1—r3 which serve as a square wave oscillator sensitive to both position and load torque, as previously mentioned. The OFF time begins when the wiper unit 66 engages a conductive segment on the ring r3 and ends as soon as either of the following events takes place: (1) the base voltage of the transistor Q1 decays to −0.4 volts as determined by the RC time constant or (2) the wiper unit 66 breaks its electrical connection with the conductive segment on the ring r3. Since the RC time constant is fixed for a given position of the wiper arm WA, as mentioned previously, the OFF time can never exceed this amount of time. Therefore, as the time for each complete cycle of the switch represented by rings r1—r3 increases in length due to the motor slowing down in response to an increased load (that is the frequency of the cycles decreases), the percentage of time that the motor is ON relative to the time that it is OFF will increase. This increase in full power ON time results in improved speed torque curves such that when the speed of the motor at high, medium and low speed settings is plotted versus the torque on the motor, with speed as the ordinate and torque as the abscissa, the resulting three curves each approach the desired horizontal lines. At each speed setting, the speed decreases only a small amount as the load on the motor increases. This is a big improvement over the conventional motor control having the variable resistor in series with the motor wherein the motor speed at lower speed settings drips off drastically as the load on the motor increases.

Of course, it will be appreciated that although the continuously variable, pulsed mode of operation has been described in connection with controlling a windshield wiper system, and is particularly useful in such a system, it can be used for controlling the speed of motors in general to provide the same improved speed-torque characteristics for the motor. Further, although the printed circuit card and wiper assembly provide an excellent simplified manner for producing square wave oscillations for pulsing the motor wherein the percentage of ON time of each pulsing cycle increases as the load on the motor increases and decreases as the load on the motor decreases, other apparatus could be used for generating the square wave oscillations responsive to the angular position of the motor to provide substantially the same variation of ON time percentage.

INTERMITTENT MODE OF OPERATION

When the mode switch 76 is placed in the TNT (intermittent) position by moving the knob 80 to its extreme clockwise position, the moveable contact of each of the switches S1—S5 engages the extreme clockwise contacts of each switch. In this position wherein the wiper blades operate intermittently, the circuit is exactly the same as when in the continuously variable position previously described except that a larger capacitor C2 is connected to the base of the transistor Q1 when the conductive segment r1A is engaged by the wiper contact unit 66 to provide a larger time constant for the dwell period at the end of a wiping cycle, as will be described. The capacitor C1 is electrically connected to the base of the transistor Q1 but functions only when the conductive segment r1B is engaged by the wiper contact unit 66. In the intermittent mode of operation, each wiping cycle of the windshield wipers is divided into three regions; full torque, controlled torque and the θ region which, as previously mentioned, is centered about the park position of the wiper blades. The full torque region corresponds to the portion of the upstroke of the wiper blades beginning with the end of the θ region and terminating at the gap 38 between the conductive segments r1A and r1B which, in this embodiment, is located at the turnaround point at the end of the upstroke but could be located elsewhere to change the length of the full torque region. Therefore, on the printed circuit card 32, the gap 38 is diametrically opposite the middle of the θ region, and the controlled torque region corresponds with the portion of the downstroke from its beginning to the beginning of the θ region.

It is desirable to have full torque on the upstroke of the windshield wiper blades to remove any obstacles or for "iced in" blades. In this full torque region the motor 22 is connected directly to ground through rings r6 and r5 to electrically remove the transistors from the circuit. Ring r5 is connected directly to ground through the extreme clockwise contact of switch S5 and ring r6 is connected directly between the transistor Q2 and motor 22. Since the conductive segment of the ring r6 is coextensive with the full torque region, the wiper contact unit 64 will complete the circuit between these rings, and therefore connect the motor 22 directly to ground to remove the transistors from the circuit during the full torque region, and the transistors will be automatically electrically connected back into the circuit as soon as the wiper contact unit 64 leaves the conductive segment of the ring r6.

During the controlled torque region at the beginning of the downstroke, the input power to the motor is controlled as in the continuously variable mode through the conductive segment r1B and capacitor C1 to pulse the motor, as previously described. However, it will be noted that the speed of the motor in the controlled torque region will depend upon the position of the wiper arm WB on the potentiometer P1 which is connected to the negative potential —B through the conductive segment r9B of the ring r9 which lies in the controlled torque region, the position of the wiper arm WB being controlled by the safety skip lever 88 (FIG. 1) as previously explained. The wiper arm WA on the potentiometer P1 is electrically connected in the circuit only during the θ region by the conductive segment r9A which is coextensive with the θ region.

Controlling the speed of the motor 22 by means of the safety skip lever 88 during the controlled torque region serves to control the kinetic energy of the windshield wiper system as it enters the θ region. At the beginning of the θ region, the transistors are turned OFF and the wiper blades coast until the work done by the blades against the windshield brings them to rest (in a light rain) somewhere in the θ region, depending upon the kinetic energy of the system as it enters the θ region and the moisture on the windshield which determines the drag of the blades against the glass. The wiper blades will come to rest in one of the five conductive segments on the ring r3 in the θ region and will dwell for a period of time determined by the position of the wiper arm WA on the potentiometer P1, which again is controlled by the ring 84 of the mode switch.

When the capacitor C2 is connected to ground through the switch S1, conductive segment r1A and ring r3, it immediately makes the base of the transistor Q1 positive and turns the transistors (and motor 22) OFF until the capacitor discharges sufficiently through the resistor R2 and potentiometer P1 so that the voltage on the base of the transistor Q1 decays to about —0.4 volts. The transistors then turn back ON as previously described and energize the motor 22.

When in the intermittent mode of operation, the ring r3 is not tied directly to ground as it was in the continuously variable mode of operation. The contact fingers contacting rings r4, r5, r6 and r7 are shorted together since they form part of the same wiper contact unit 64. Since the ring r5 is now connected to ground through switch S5 and the conductive segment of ring r4 is a physical extension of the conductive segments of ring r3, ring r3 is connected to ground during the controlled torque and θ regions and is electrically disconnected from the circuit during the full torque region. When the wiper contact unit 62 is on the conductive segment r9A, the negative potential —B is connected to potentiometer P1 through the wiper arm WA so that the position of the wiper arm WA controls the dwell time. When the wiper contact unit 62 is on the conductive segment r9B, the negative potential —B is connected to the potentiometer P1 through the wiper arm WB so that the position of the wiper arm WB determines the speed of the motor in the controlled torque region, and therefore the kinetic energy of the system as it enters the θ region, as will be described in greater detail hereinafter. It will be noted that the conductive segment r1B is substantially coextensive with the conductive segment r9B and that the segment r1A overlaps slightly into the θ region. This overlap does no harm and provides additional tolerance on wiper position.

During the full torque region, the ring 3 is an open circuit. Although the two-pole, single-throw switch in effect provided by rings r1, r2, r3 and rotating wiper contact unit 62 operates mechanically, only the conductive segment r1A and ring r2 are used electrically. When the conductive segment r1A is connected to ring r2 during the full torque region, the capacitor C2 is charged. At the end of the full torque region, capacitor C2 is fully charged and is electrically disconnected from the circuit with the charge retained until later.

At the beginning of the controlled torque region, ring r3 is connected to ground through rings r4 and r5. The circuit uses capacitor C1 by means of conductive segment r1B to operate in the continuously variable mode previously described. The potentiometer P1 is connected in the circuit through wiper arm WB (the sensitivity control) by the conductive segment r9B. Thus, all the components required for the continuously variable mode of operation are in the circuit during the controlled torque region and the control operates in the continuously variable mode until the wiper contact assembly 61 leaves the controlled torque region and enters the θ region.

At the end of the controlled torque region, the conductive segment r1A is engaged by the wiper contact assembly to connect the fully charged capacitor C2 back into the circuit, while the conductive segment r9A is engaged to connect the potentiometer P1 in the circuit through the wiper arm WA so that the control circuit operates in its intermittent mode, as described previously. After the control either times out (or skips the dwell period, as will be described), the capacitor C2 is again charged in the full torque region and the cycle repeats.

If the ring r3 in the θ region were one solid conductive segment rather than being divided into five conductive segments as illustrated, the motor 22 would drive the wiper blades out of the θ region into the full torque region wherein the rings r6 and r5 remove the transistors from the circuit and connect the motor 22 directly to ground as previously described. Consequently, the dwell time at the end of each wiping cycle would depend solely on the RC time constant provided by the capacitor C2 and the resistor R2 and potentiometer P1. Since dwell times up to 15 or 20 seconds may be desired, the capacitor C2 would have to be quite large. However, when the ring r3 is divided into five conductive segments in the θ region as illustrated in FIG. 2, the motor 22 will be energized after the RC time constant times out until the wiper unit 66 reaches the beginning of the next conductive segment on ring r3, at which point the motor will be deenergized for another dwell period, the wiper contact unit 66 having passed over a conductive segment on the ring r2 in the gap between the conductive segments on ring r3 to recharge the capacitor C2 before the motor stops. When the wiper contact unit 66 stops on the next conductive segment on the ring r3, as just described, the conductive segment r1A will be connected to ground through the ring r3 to cause the base of the transistor Q1 to go positive as already described to deenergize the motor 22 for another dwell period controlled by the RC time constant.

This operation repeats itself until the motor 22 steps the wiper contact assembly out of the θ region into the full torque region. Thus the total dwell time at the end of a wiping cycle depends on the number of stops the wiper blades make in the θ region multiplied by the time required for the RC time constant to time out during each stop. Therefore, a smaller capacitor (still larger than capacitor C1) can be employed to provide the aforementioned 15 to 20 second dwell periods, if dwell periods of this length of time are desired. Further, if the blades stop so that the wiper contact unit 66 is on the first conductive segment on ring r3, a maximum dwell period will be provided, and if the wiper blades coast further after the motor 22 is deenergized at the beginning of the θ region so that the wiper contact unit 66 stops on the last and shortest conductive segment on ring r3, a minimum dwell period will be provided. It is apparent that this is exactly what is desired. The more moisture on the windshield, the further the wiper blades will coast into the θ region so as to require fewer steps for the wiper blades to get out of the θ region. Therefore, the total dwell time at the end of such a wiping cycle will be relatively short, and the frequency of wiping strokes will be correspondingly higher to keep the windshield clear. On the other hand, when the moisture on the windshield decreases, as it will when the rainfall decreases, the wiper blades will coast to a stop earlier in the θ region, and thus provide a longer dwell period at the end of each wiping cycle. In this manner, the control device of the present invention is automatically sensitive to the amount of moisture on the windshield to provide a longer dwell period when the moisture is low so as to require a lower frequency of wiping strokes to keep the windshield clear, and a shorter dwell period when the moisture increases so as to require a higher frequency of wiping strokes to keep the windshield clear.

SAFETY SKIP FEATURE

This leads to still another unique feature of the control device of the present invention. While in the intermittent mode of operation as just described, the rainfall may become heavy, or spray from traffic may significantly increase the moisture on the windshield. Under these and similar conditions, it is safer if the wiper blades operate continuously rather than in the intermittent mode with the dwell period at the end of each wiping cycle. The control device of the present invention automatically changes to a safety skip mode of operation when the amount of moisture on the windshield exceeds a threshold value wherein the dwell period is skipped at the end of each wiping cycle so as, in effect, to place the wiper blades in continuous operation. Since the friction of the wiper blades on the windshield varies with the amount of moisture on the windshield (the friction decreasing as the moisture increases) when the amount of moisture on the windshield reaches the threshold value, the wiper blades will coast through the θ region and enter the full torque region without coming to a stop when the moisture increases above the aforementioned threshold value.

Consequently, the motor 22 will be energized as soon as the full torque region is entered to skip the dwell period and start another cycle. The capacitor C2 is recharged during the full torque region, and the system prepares to make the decision as to whether or not it will dwell at the end of the return stroke. The dwell periods will continue to be skipped as long as the moisture is above the threshold value and thus, in effect, provide continuous operation. When the moisture on the windshield drops below the threshold value, the wiper blades will again coast to a stop and dwell in the θ region as previously described and resume intermittent operation.

Essentially, if the work done by the wiper blades in the θ or coast region is equal to the kinetic energy of the system, the wiper blades will stop and the control will time out. If the work done is less than the kinetic energy of the system, the blades will not stop and the dwell period will be skipped. The amount of energy removed from the system by the blades moving across the windshield in the θ or coast region is greatly affected by the moisture on the windshield. Variations in kinetic energy also can occur from vehicle to vehicle due to variations in battery voltage and losses in the system, and also from changes in the condition of the rubber of the wiper blades. Personal preference of the operator can also dictate how much moisture is on the glass at the time the safety skip occurs. For these reasons, a sensitivity control is provided which can be controlled by the vehicle operator by adjusting the safety skip lever 88 to vary the position of the wiper arm WB on the potentiometer P1 and thus control the speed of the motor in the controlled torque region.

Basically, the safety skip lever 88 allows the pulsed input power to the motor to be controlled as previously described so that if the driver prefers more moisture to be present on the windshield before the wiper blades skip the dwell period, he can adjust the lever so that the pulsed input power to the motor 22 is reduced. Obviously, with less kinetic energy at the beginning of the θ region, more moisture (and thus less friction) is required before the wiper blades will skip the dwell period. If desired, however, the wiper arm WB can be connected to the negative voltage −B through the conductive segment r9B which is coextensive with the controlled torque region and the position of the wiper arm WB adjusted at the factory and, thereafter, infrequently adjusted by a mechanic or the like rather than being controlled by the safety skip lever 88. However, the safety skip lever 88 provides a very simple and desirable control to enable the operator to dial in the desired safety skip point at the time he selects the intermittent mode of operation.

Capacitor C1 is used during the controlled torque region of the cycle while the larger capacitor C2 is used in the θ region to provide the dwell time. Since the capacitors C1 and C2 are used in different portions of the cycle, only one potentiometer P1 is required along with the two wipers WA and WB to provide the individual adjustments. The motor 22 receives a pulse of power through the conductive segments on ring r2 in the θ region before it reaches the beginning of each subregion defined by the beginning of the conductive segments on the ring r3, this burst of power occurring so that the capacitor C2 can be recharged between subregions. The varying angular lengths allotted to the conductive segments on ring r2 in the θ region for charging the capacitor C2 result in varying the dwell time associated with each subregion. This refinement can lead to further economies in the control unit. The maximum dwell time in a single step model (one subregion or conductive segment on the ring r3 in place of the five illustrated) depends solely upon the RC time constant involved, as previously mentioned. The maximum value of the resistance employed (resistor R2 plus potentiometer P1), depends upon the transistor gain. The higher the value of the resistance, the more the transistor gain required. The lower the value of the resistance, the less transistor gain required. However, the maximum time in a multiple (n) step model (such as the five subregion model illustrated) can be (n) times that of a single step model for the same RC time constant, as already explained. Thus, to achieve the same maximum dwell time, the value of the resistance (resistor R2 plus potentiometer P1) also can be decreased by a factor of (n) which, in turn, enables the transistor gain required also to be reduced by a factor of (n). If desired, a sufficient number of subregions can be employed in the θ region so as to require only one transistor rather than the two illustrated in FIG. 4.

Further, since the dwell time is automatically adjusted in response to the moisture on the windshield, the potentiometer and wiper arm WA for providing dwell time adjustment can be eliminated, if desired. It is clear that discrete values of safety skip sensitivity adjustment would also be satisfactory. If there are (n) safety skip sensitivity adjustments, there can be (n) distinct fixed speeds when operating in the continuous mode, rather than an infinitely variable number of speeds as previously described. The economical circuit based on these principles and yet containing all of the refinements of the circuit of FIG. 4 is shown in FIG. 5.

Figure 5:
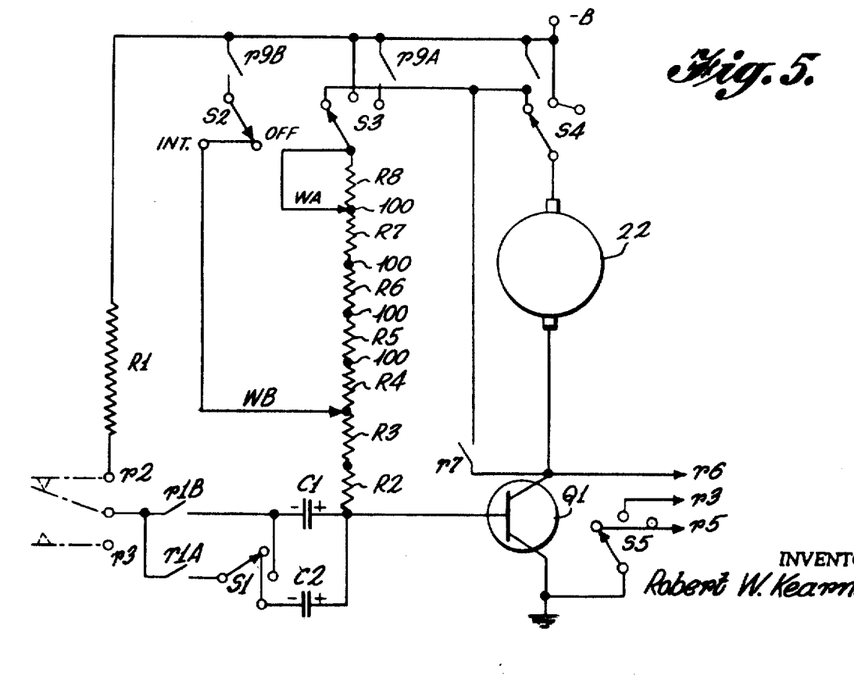
FIG. 5 is a schematic circuit diagram similar to FIG. 4 illustrating a modification of the invention.

Referring specifically to FIG. 5, it will be noted that the control circuit illustrated is similar to the control circuit of FIG. 4 with the following exceptions. The transistor Q2 is eliminated and the potentiometer P1 replaced by a plurality of series connected resistors R3—R8. Suitable tap points 100 are provided between and at the ends of the series connected resistors R3—R8 for cooperating with wiper arms WA and WB to vary the total resistance in the circuit by discrete increments. Although five resistors with six tap points are illustrated, it is apparent that this number can be increased or decreased if desired. The wiper arm WB is connected to the INT contact of the switch S2 and the wiper arm WA is connected to the movable contact of the switch S3. The movable contact of the switch S2 is connected to the source of negative potential —B through the conductive segment r9B on the ring 59. The switch S3 is connected as before with the exception that the movable contact thereof is connected to the end of the resistor R8 for a purpose to be described.

In the continuously variable mode of operation, the control circuit functions in the same manner as previously described with its speed determined by the position of the wiper arm WA which controls the resistance of the RC time constant including the capacitor. The primary difference is that movement of the wiper arm WA from one tap to another discretely varies the resistance whereas in the control circuit of FIG. 4 the resistance of the potentiometer is infinitely variable. However, it is apparent that a small number of the resistors R3—R8 provide an adequate speed adjustment as a practical matter.

By connecting both the wiper arm WA and the resistor R8 to the movable contact of the switch S3, base current can flow in the transistor Q1 while the wiper arm is being shifted from one tap point to another. If this end of the resistor R8 were not electrically connected to anything, such as is the case with the upper end of the potentiometer P1 of FIG. 4, the transistor Q1 would be turned OFF to deenergize the motor 22 while the wiper arm WA is being shifted except possibly for the brief pulses, that would occur when the capacitor C1 is being charged through ring r2.

In the intermittent mode of operation, the wiper arm WA is electrically connected in the circuit by the conductive segment r9A during the θ region, and the wiper arm WB is electrically connected in the circuit by the conductive segment r9B during the controlled torque region. Therefore, the wiper arm WB can be adjusted to control the speed of the motor in the controlled torque region by controlling the number of resistors R4—R8 connected in the circuit between the positive terminal of the capacitor C1 and the source of negative potential —B, and the wiper arm WA can be adjusted to control the time constant during the dwell period in the θ region.

MODIFIED DEPRESSED PARK

During the intermittent mode of operation, the position of the wiper blades during the dwell period varies within the θ region in response to the moisture on the windshield, as previously described, but when the mode switch 76 is turned to the OFF position, the wiper blades are accurately stopped at the bottom of the return stroke by the short conductive segment on ring r7. Referring specifically to FIG. 4, it will be observed that the circuit in the OFF position is exactly the same as in the intermittent position of the mode switch 76 except that, in addition, rings r7 and r9 are used. When the control is in the OFF mode, power is supplied to the circuit through ring r8 so that the wiper blades will complete an intermittent mode cycle. On a moist windshield, the wiper blades will stop at the end of the wiping cycle, the control will time out, and the motor 22 will start up again. During the startup, the kinetic energy is low and the ring r8 becomes open-circuited to remove power from the motor just before the bottom of the return stroke. When the wiper contact unit 64 of the wiper contact assembly engages the short conductive segment on the ring r7, the armature of the deenergized motor is short-circuited so the remaining kinetic energy of the system is dissipated in electrodynamic braking to brake the wiper blades to an abrupt stop within the conductive segment on the ring r7.

On a wetter windshield, the wiper blades will coast further into the θ region and therefore the system will still possess some kinetic energy when the wiper contact unit 64 reaches the short conductive segment on ring r7. When coasting, the motor is deenergized by the transistors, and again the motor is disconnected from the negative potential —B when the ring r8 open circuits. The dynamic braking action is thereafter provided by the conductive segment on the ring r7 and is still capable of stopping the wiper blades within the short conductive segment because the system has lost energy while traversing the preceding portion of the θ region. It is the loss of energy in the θ region or the fact that the motor is just starting up after a dwell period which enables the conductive segment on ring r7 to be short so as to provide a close position control of the OFF position of the wiper blades. The control circuit illustrated in FIG. 5 functions in a similar manner when the mode switch 76 is moved to the OFF position to complete an intermittent cycle of operation and bring the blades to final rest when they reach the conductive segment on the ring r7.

Figures 6, 7:
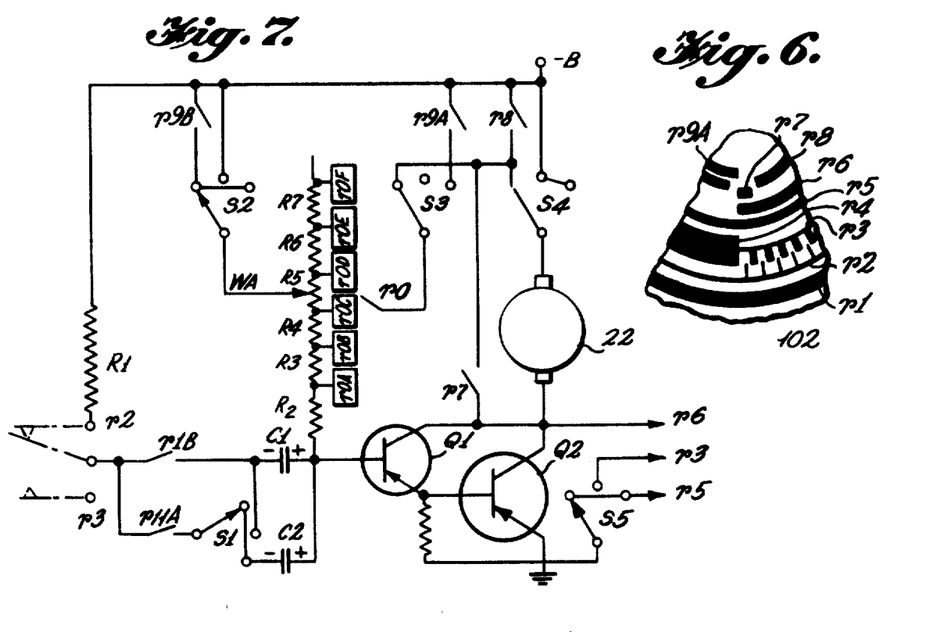
FIG. 6 is a fragmentary view of the conducting ring face of a printed circuit card illustrating another modification of the invention.
FIG. 7 is a schematic circuit diagram similar to FIG. 4 illustrating another embodiment of the invention.

Referring to FIG. 6, a fragmentary portion of a printed circuit card 102 is shown to illustrate a modification of the invention. On this printed circuit card 102, the θ region lies entirely within the return stroke of the wiping cycle, rather than being partially in the return stroke and partially in the upstroke as is the case of the printed circuit card 32 illustrated in FIG. 2, and the upstroke of the next wiping cycle begins at the end of the θ region. The conductive segment on the ring r7 lies entirely within the upstroke. The ring r5 is at ground potential, as can be seen by referring to FIG. 4, and since the wiper contact unit 64 associated with the rings r4, r5, r6 and r7 electrically interconnects these rings, then the ring r6 is also at ground potential. Therefore, the collector of the transistor Q2 is connected to ground the entire length of the conductive segment r6 which on the card 102 is coextensive with the entire upstroke of the wiping cycle so that the full torque region is coextensive with the entire upstroke. This applies full power to the motor 22 with the transistors removed from the circuit during the entire upstroke.

This provides an important advantage in that when the wiper blades are located anywhere within the conductive segment on the ring r7 (as they will be when the system is turned OFF) and the mode switch 76 is turned ON for a subsequent operation, the transistors will be removed from the circuit because the wiper blades are in the full torque region wherein the collector of the transistor Q2 is grounded through ring r6. Consequently, full power is immediately provided and if the blades are not able to move when turned ON, such as when they are frozen in place in the winter time, the motor 22 will be the only component subject to stall torque conditions. The motor, of course, is designed to take stall torque conditions for about 10 minutes or so until a bimetal contact opens, and therefore will not be damaged if the wiper blades cannot be moved.

Further, in the OFF position of the mode switch, the wiper blades will stop within the conductive segment on the ring r7 of the card 102 as previously described, because the ring r8 positively deenergizes the motor by disconnecting the side of the motor connected to the switch S4 from the negative potential −B. Since the θ region lies entirely within the return stroke of the wiping cycle, the wiper blades when operating on a wet windshield must traverse the entire θ region before reaching the conductive segment on the ring r7 so as to lose more energy than in the case of the printed circuit card 32 previously described.

The printed circuit card 32 of FIG. 2 could be employed with one long conductive segment on the ring r3 in the θ region in place of the five conductive segments (or subregions) illustrated to provide what might be termed a single stop control device. The dwell time of such a control device would be established by the position of the wiper arm WA on the potentiometer P1. By mounting the resistance element of the potentiometer on the printed circuit card in the θ region and mounting the wiper arm WA on the arm 68 (FIG. 3) which rotates the wiper contact assembly, the position where the motor stops in the θ region will automatically determine the resistance of the RC time constant, and hence determine the dwell time. When the wiper blades stop early in the θ region in response to a drier windshield, the potentiometer resistance on the printed circuit card would be great and the dwell time would be long. When the wiper blades stop just short of the end of the θ region in response to a wetter windshield, the potentiometer resistance would be low and the dwell time would be short. In both cases, this is the desired result, and accordingly this technique would provide an automatically variable moisture sensitive dwell period.

Further, since the potentiometer can be approximated by a group of series connected resistors with tap points, the tap points can be connected to conductive segments on a ring of the printed circuit card in the θ region so that the plurality of segments (n) make up the θ region. When the wiper contact assembly stops on any particular segment, the time delay will be determined by the amount of resistance remaining in the θ region. Such a group of segments is shown in the control circuit of FIG. 7 and the printed circuit card 104 illustrated in FIG. 8 which is used with this embodiment.

Figure 8:
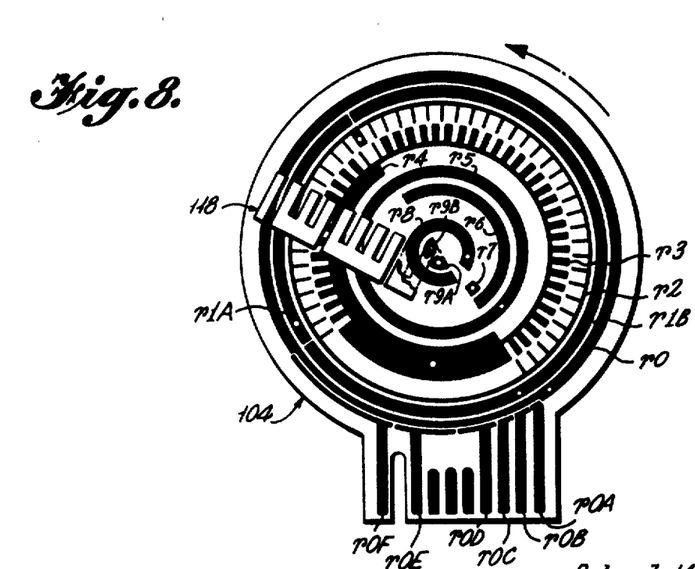
FIG. 8 is a view of the conductive ring face of the printed circuit card employed with the embodiment illustrated in FIG. 7.
Figure 10:
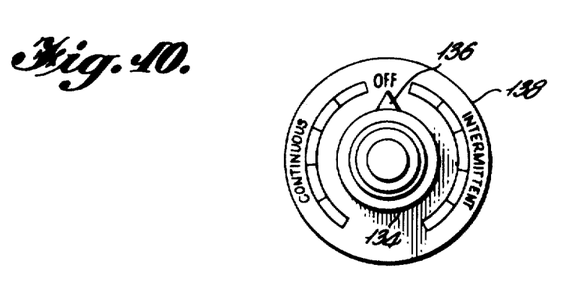
FIG. 10 is an enlarged end view of the control knob and indicator disc of the mode switch of FIG. 9.
Figure 12:
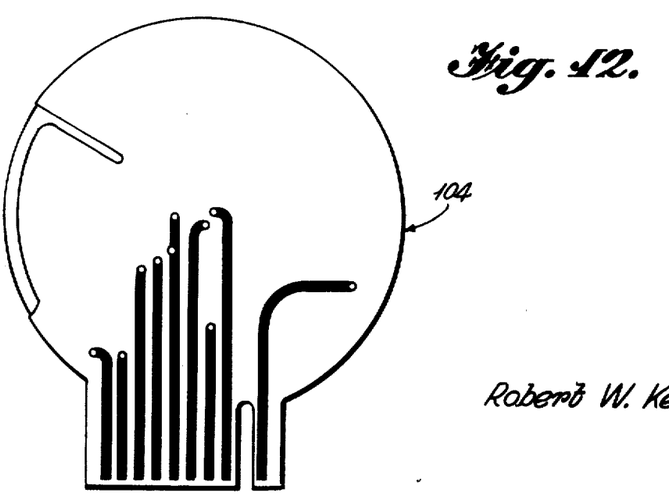
FIG. 12 is a view of the back face of the printed circuit card of FIG. 8.

Referring to FIG. 8, the printed circuit card 104 is provided with an additional ring r0 having a plurality of conductive segments r0A, r0B, r0C, r0D, r0E and r0F adjacent thereto in the θ region which are electrically connected to separate terminals on one face of the base 40 of the card. The terminals on the other face of the card are electrically connected to the rings r0—r9B as illustrated in FIG. 12 to enable the card to be inserted in a card connector 106 as illustrated in FIG. 10.

Referring to FIG. 9, a windshield wiper assembly 108 is shown which illustrates another embodiment of the invention. It comprises another conventional type of motor unit 110 having an electrical motor 112 drivingly connected to a large gear 114 in a speed reducer housing 116. The gear 114 rotates an output shaft 106 which in turn rotates a conventional crank arm (not shown) connected to the links 28 and 30 which actuate the wiper blade assemblies (not shown) for oscillating the wiper blades back and forth across the windshield as previously described. A wiper contact assembly 118 is mounted on the inner end of the output shaft 106 by an arm 119 as previously described. It has four electrically isolated wiper contact units 120—126 which have one, three, four and two spring contact fingers, respectively, which slidably engage the rings r0—r9, respectively, as best seen in FIG. 8. A suitable cover plate (not shown) is bolted to the speed reducer housing 116 to enclose the gear 114. The printed circuit card 104 is mounted within the housing in position to be slidably engaged by the wiper contact assembly 118 with the base 40 projecting from the housing 116 to facilitate connection to the card connector 106.

The transistors, capacitors and resistors of the control circuit illustrated in FIG. 7 are contained in an electrical unit 128 which is electrically connected to the motor unit 110, the card connector 106 and a mode switch 130 mounted on the dashboard 132 of the vehicle. The mode switch 130 has a single control knob 134 for controlling each of the five switch sections S1—S5 of the mode switch and for controlling the single wiper arm WA of the potentiometer P1 as shown in FIG. 7. The control knob 134 has a pointer 136 thereon which cooperates with an indicator disc 138 to indicate the position of the knob as most clearly illustrated in FIG. 9. When the pointer 136 points directly upwardly to the OFF position, each of the switch sections S1—S5 is positioned in the OFF position as illustrated in FIG. 7, and the wiper arm WA is positioned at the midpoint of the potentiometer P1 as shown. When the control knob 134 is turned in a clockwise direction, the switch sections S1—S5 are immediately actuated to their extreme clockwise contacts to place the circuit in the intermittent mode of operation, and as the control knob 134 is rotated further in a clockwise direction, the wiper arm WA moves up the potentiometer P1 to increase the potentiometer resistance in series with the resistor R2. This increases the time for the capacitor C1 to discharge which increases the percentage of OFF time of the transistors in the controlled torque region of the wiping cycle to decrease the speed of the wiper blades. As previously described, controlling the speed of the wiper blades in the controlled torque region controls the skip sensitivity of the wiper blades. Therefore the operator can simply rotate the control knob 134 to the right to select the skip point sensitivity suitable for the condition of the windshield at the time he selects the intermittent mode of operation.

When the operator turns the control knob 134 in a counterclockwise direction from the OFF position as illustrated in FIG. 9, each of the switch sections S1—S5 is immediately actuated to their middle contact to place the control circuit in the continuous mode of operation. As the control knob is turned further to the left in a counterclockwise direction, the wiper arm WA moves down the potentiometer P1 from the midpoint to increase the percentage of ON time of each pulse to increase the speed of the motor.

Referring to FIG. 8 again, the ring r3 of the printed circuit card 104 has one elongated conductive segment in the θ region which lies completely within the return stroke of the wiping cycle and ends at the bottom of the return stroke of the wiping cycle. The short conductive segment on the ring r7 lies completely within the upstroke as described in connection with FIG. 6. The conductive segment on the ring r9A is coextensive with the θ region and may extend slightly into the full torque region since this does no harm and provides additional tolerance control. The conductive segment r9B is coextensive with the controlled torque region and also may extend into the full torque region since again this does not affect the operation. The conductive segment r1A extends from the gap 36 at the beginning of the θ region to the gap 38 at the end of the upstroke and the conductive segment r1B is coextensive with the controlled torque region. The ring r6 determines the full torque region which, in this embodiment, is coextensive with the entire upstroke of the wiping cycle. The ring r4 is coextensive with the entire return stroke of the wiping cycle which, in this embodiment, comprises the controlled torque region and the θ region. The ring r8 is interrupted by a single gap longer than the length of the conductive segment on the ring r7 and the ring r5 is a complete ring, as before in the embodiment of FIG. 2.

Referring to FIG. 7 as well as FIG. 8, when the control knob 134 of the mode switch 130 (FIG. 9) is rotated counter-clockwise to the continuously variable position so as to activate the middle contact of each of the switches S1—S5, the wiper arm WA is electrically connected to the source of negative potential —B, and the control knob can be adjusted to vary the potentiometer resistance connected in the circuit with the capacitor C1 to determine the speed of the motor in the continuously variable mode of operation, as previously described. The motor 22, of course, is connected directly to the source of negative potential —B by the switch S4, the ring r0 is electrically disconnected from the circuit and the ring r3 is connected to ground through the switch S5.

When the mode switch 130 is switched to the intermittent position wherein all of the movable contacts of the switches S1—S5 engage the extreme clockwise contact, the wiper arm WA is electrically connected to the source of negative potential —B through the conductive segment r9B. The ring r0 is connected to the source of negative potential —B through the switch S3 and conductive segment r9A, and the ring r5 is grounded through switch S5. The capacitor C2 is added to the circuit through the switch S1 and the conductive segment r1A, and the capacitor C1 is connected in circuit during the controlled torque region by the conductive segment r1B. The speed of the motor during the controlled torque region is determined by the position of the wiper arm WA which controls the potentiometer resistance connected to the capacitor C1 to determine the RC time constant in the controlled torque region.

When the wiper blades enter the θ region, the capacitor C1 is electrically disconnected from the circuit and the capacitor C2 is connected to ground during the entire θ region by the elongated conductive segment on the ring r3. As previously described, the capacitor C2 is charged on the upstroke with the charge retained during the controlled torque region. The base of the transistor Q1 immediately becomes positive to turn the transistors OFF and deenergize the motor 22 when the negative terminal of the capacitor C2 is grounded. The wiper blades will coast as previously described, and assuming the windshield is not wet enough to cause the dwell period to be skipped, they will come to rest at some point in the θ region with the wiper contact assembly 118 on one of the conductive segments r0A—r0F.

The particular conductive segment r0A—r0F which is connected to the negative potential —B through ring r0, switch S3 and the conductive segment r9A determines the potentiometer resistance connected to the capacitor C2 to control the length of the dwell period. The further the wiper blades coast into the θ region in response to increased moisture on the windshield before stopping, the lower value of resistance connected to the capacitor C2, and the shorter the dwell period which, of course, is the desired result. When the capacitor C2 discharges sufficiently so that the base of the transistor Q1 is no longer positive, the transistors are turned ON to energize the motor 22 to drive the wiper blades out of the θ region and into the full torque region wherein the transistors are removed from the circuit and the motor 22 is connected directly to ground through the rings r6 and r5. Thus this embodiment provides a single stop dwell period with the length of the dwell period automatically responsive to the moisture on the windshield.

When the mode switch 130 is turned to the OFF position, which is the position illustrated in FIG. 10, the control device completes one cycle of the intermittent mode of operation as already described, the motor is automatically deenergized when the wiper contact assembly 118 leaves the ring r8 and then electrodynamically braked when the wiper contact assembly engages the short conductive segment on the ring r7. This immediately stops the wiper blades in the desired park position. Since the conductive segment on the ring r7 lies entirely within the full torque region, the transistors will be removed from the circuit when the mode switch 130 is turned back on for a subsequent operation so that any stall torque will be absorbed by the motor and not the transistors. From the foregoing it is apparent that the printed circuit card 104 provides the advantages discussed in connection with the embodiment of FIG. 6, including the advantage of having the θ region lie entirely within the return stroke of the wiping cycle to provide the maximum reduction of kinetic energy before reaching the short conductive segment on ring r7.

Figure 11:
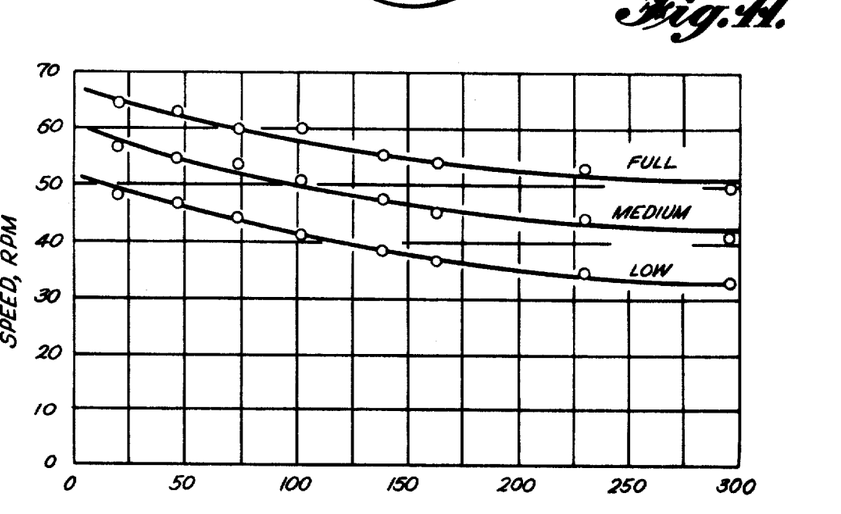
FIG. 11 is a graph illustrating speed-torque curves.

Referring to FIG. 11, the improved speed torque curves obtained by the embodiment of FIGS. 7—9 are illustrated with the speed or r.p.m. of the output shaft 106 of the wiper motor unit 110 plotted against the torque on the output shaft in ounce inches. Three separate curves are shown for full, medium and low speed in the continuous mode of operation. An ideal speed torque curve of course would be a horizontal line, and this ideal is approached by the curves of FIG. 11 at high loads. At light loads the curves have a greater slope which is an advantage in the intermittent mode of operation.

Referring to FIG. 13, an improved printed circuit card 260 is illustrated which is reversed relative to the card 104 of FIG. 8 for cooperating with a clockwise rotating wiper contact assembly 118. The gaps in the rings r0 and r1 are slanted rather than being disposed radially so that the wiper contact fingers engaging these rings will not lose contact with conductive segments on these rings when crossing the gaps. This eliminates the possibility of the wiper contact unit stopping in the gap out of contact with a conductive segment so as to require a dwell period before the transistors turn ON to move the wiper contact assembly out of the gap. Also very short segments 262 and 264 are interposed between the conductive segments on the rings R2 and R3, respectively and a longer segment 266 is provided on the ring r2 in the θ region all of which are made of the same material as the conductive segments but are not electrically connected to the terminals on the base 40 of the card. These added segments improve the wear resistance and life of the card and minimize any tendency for the wiper contact fingers to wipe insulating material over the conductive segments in a manner to interfere with the electrical connection between the wiper contact fingers and the rings R2 and R3. Segments 268—276 are provided on rings r9, r8, r7, r6 and 50, respectively, for the same purpose. Lines or gaps between the wear segments and conductive segments of 0.010 inches wide can be readily controlled with present day printed circuit manufacturing techniques.

Referring to FIG. 14 a modification of the control circuit of FIG. 7 is illustrated wherein a separate potentiometer P1 is provided without taps and separate series connected resistors R3—R7 are provided for the variable dwell period feature. This allows the various dwell periods to be changed as desired by simply using resistors R3—R7 having the necessary value.

While it will be apparent that the embodiments of the invention herein disclosed are well calculated to fulfill the objects of the invention, it will be appreciated that the invention is susceptible to modification, variation and change without departing from the proper scope or fair meaning of the subjoined claims. For example the transistors Q1 and Q2 could be changed to NPN transistors and the source of negative potential —B changed to a positive potential +B. Although two capacitors C1 and C2 have been shown because of the two quite different RC time constants involved, the large capacitor could be used for both. If this is done then only a small part of the potentiometer would be used or some additional resistors could be switched into the potentiometer so that all variation would not occur at one end of the potentiometer. It is also noted that additional switching functions could be added to the printed circuit card to control various auxiliary devices such as the windshield washer, blinking safety lights or tail lights, a windshield heater unit or deicer unit and so forth. In the case of the windshield washer control the washer unit when energized, could be interrupted briefly to allow the blades to pass so as to reduce the amount of washer fluid which is hurled outside the wipe pattern. The washer unit could also be deenergized during any dwell period that might occur if the control device is in the intermittent mode in the event the washer fluid squirted on the windshield does not place the system in the safety skip mode of operation.

What I claim is:

1. In a windshield wiper-cleaning system, a wiper motor unit for actuating said wiper-cleaning system through repeating wiping cycles, and manually activated automatic control means for activating said motor unit intermittently to produce an intermittent mode of operation with a dwell period at the end of each wiping cycle, said control means deactivating said motor unit through an angle $\theta$ at the end of each wiping cycle, said control means including means for varying the kinetic energy of said system as it enters said $\theta$ region and means for reactivating said motor unit to commence another wiping cycle after a predetermined dwell period when said system coasts to a stop in said $\theta$ region.

2. The windshield wiper-cleaning system as defined in claim 1 wherein said motor unit is automatically reactivated to commence another wiping cycle when said system coast through said $\theta$ region without stopping so as to skip the dwell period.

3. The windshield wiper-cleaning system as defined in claim 1 wherein said control means includes rotary switch means driven by said motor unit comprising a plurality of conductive rings slidably engaged by a wiper contact assembly which rotates one complete revolution relative to said conductive rings for each complete wiping cycle, said conductive rings controlling the deactivation of said motor unit in said $\theta$ region.

4. The windshield wiper-cleaning system as defined in claim 3 wherein the motor of said wiper motor unit is an electric motor.

5. The windshield wiper-cleaning system as defined in claim 4 wherein said manually activated control means includes a mode switch having an OFF position and an intermittent position for operating said wiper-cleaning system in said intermittent mode of operation, and wherein said plurality of conductive rings includes conductive rings which are electrically activated when said mode switch is turned to said OFF position to provide a parking mode of operation for completing an intermittent wiping cycle and parking said wiper-cleaning system in a predetermined park position at the end of the intermittent wiping cycle.

6. The windshield wiper-cleaning system as defined in claim 5 wherein said mode switch has means thereon for varying the length of time of said dwell periods.

7. The windshield wiper-cleaning system as defined in claim 6 wherein said mode switch has additional means thereon for varying the speed of said motor unit as it enters said $\theta$ region.

8. The windshield wiper-cleaning system as defined in claim 4 wherein said rotary switch means comprises an insulated member having said plurality of conducting rings thereon which is fixed against movement relative to said motor unit, and wherein said wiper contact assembly electrically interconnects groups of said rings, all electrical connections to said rotary switch means being made to said conducting rings.

9. The windshield wiper-cleaning system as defined in claim 5 wherein said mode switch includes a continuously variable position, and said plurality of conductive rings includes conductive rings which are electrically activated when said mode switch is placed in said continuously variable position for operating the wiper-cleaning system in continuously repeating wiping cycles without a dwell period a the end of each cycle.

10. The windshield wiper-cleaning system as defined in claim 9 wherein said conductive rings electrically activated by placing the mode switch in said continuously variable position include a plurality of short conductive segments for pulsing the motor in ON-OFF cycles with substantially full power being applied to the motor during the ON portion of each cycle, and including means responsive to said last-mentioned plurality of conductive segments for varying the percentage of ON time of each cycle in a manner to vary the speed of the motor in said continuously variable mode of operation.

11. The windshield wiper-cleaning system as defined in claim 10 wherein said rotary switch means comprises a printed circuit card having the plurality of conductive rings printed thereon with angularly spaced conductive segments on the conductive rings for producing the various modes of operation.

12. The windshield wiper-cleaning system ad defined in claim 3 including means for varying the length of time of said dwell periods in response to the angular position in which said wiper-cleaning system stops within said $\theta$ region, the length of time of the dwell period being a maximum when the wiper-cleaning system stops at the beginning of said $\theta$ region and decreasing as the wiper-cleaning system coasts further into said $\theta$ region before stopping.

13. The windshield wiper-cleaning system as defined in claim 3 wherein said plurality of conductive rings has a pattern of conductive segments thereon to provide a full torque region during the first half of each wiping cycle and a controlled torque region between the full torque region and the beginning of said $\theta$ region, said control means operating said motor unit at full speed and power during said full torque region and at a variable speed during said controlled torque region to enable the kinetic energy of the wiper-cleaning system as it enters the $\theta$ region to be varied.

14. The windshield wiper-cleaning system as defined in claim 4 wherein said control means comprises an insulating member having a plurality of conductive rings thereon fixed against movement relative to said motor unit, a wiper contact assembly rotated by said motor unit one complete revolution each wiping cycle and slidably engaging said conductive rings for electrically interconnecting groups of said conductive rings, transistor means for energizing said motor when the transistor means is turned ON and deenergizing said motor when turned OFF, and RC time constant means electrically connected to said conductive rings and transistor means for controlling the ON-OFF time of said transistor means, said transistor means being automatically turned OFF when said windshield wiper-cleaning system enters said $\theta$ region and said RC time constant turning said transistor means back ON after a predetermined length of time when said windshield wiper-cleaning system stops in said $\theta$ region.

15. The windshield wiper-cleaning system as defined in claim 14 wherein said wiping cycles comprise an up-stroke and return stroke and wherein said control means connects said motor directly to a source of power during the up-stroke of said wiping cycle and energizes said motor through said transistor means at a variable speed during the portion of the return stroke preceding said $\theta$ region.

16. The windshield-wiper cleaning system as defined in claim 15 wherein said $\theta$ region lies entirely within said return stroke, and wherein said plurality of conductive rings includes conductive rings electrically activated when said mode switch is turned to said OFF position to provide a parking mode of operation which completes an intermittent wiping cycle and parks said wiper system in a predetermined park position at the end of said return stroke, said park position being determined by a short conductive segment on one of said conductive rings lying entirely with the up-stroke of the wiping cycle and beginning at the end of the $\theta$ region.

17. A control device for controlling a windshield wiper motor unit adapted to oscillate wiper blade means through repeating wiping cycles, said control device comprising manually activated control means for selectively activating said wiper motor unit in an intermittent mode of operation and an off mode of operation, in said intermittent mode of operation said control means deactivating said wiper motor unit through an angle θ and activating said wiper blade means after a dwell period each time the wiper blade means stops in said θ region, one angular position in said θ region corresponding to the end of a running stroke of said wiper blade means, in said off mode of operation, said control means activating said wiper motor unit to complete the wiping cycle in progress and deactivating the wiper motor unit in said one angular position to terminate further wiping cycles whereby the wiper blade means will be parked at the end of the running stroke.

18. The control device of claim 17 wherein said one angular position is near the end of said θ region.